United States Patent [19]
Yashima

[11] Patent Number: 5,122,313
[45] Date of Patent: * Jun. 16, 1992

[54] MOLD FOR FORMING SUBSTRATE HAVING UNEVEN PREFORMAT PATTERN AND METHOD OF USING SAME

[75] Inventor: Masataka Yashima, Yokohama, Japan

[73] Assignee: Canon Kabushiki Kaisha, Tokyo, Japan

[*] Notice: The portion of the term of this patent subsequent to Jun. 25, 2008 has been disclaimed.

[21] Appl. No.: 683,859

[22] Filed: Apr. 11, 1991

Related U.S. Application Data

[63] Continuation of Ser. No. 321,404, Mar. 10, 1989, Pat. No. 5,026,510.

[30] Foreign Application Priority Data

Mar. 17, 1988 [JP] Japan .................................. 63-61844

[51] Int. Cl.⁵ ..................... B29C 39/02; B29C 39/12
[52] U.S. Cl. ........................... 264/1.3; 264/1.9; 264/106; 264/129; 249/117; 249/140; 425/810; 425/543; 425/411; 425/414; 425/416; 425/422
[58] Field of Search ............... 264/106, 107, 1.3, 1.9, 264/129; 425/810, 543, 411, 414, 416, 422; 249/117, 140

[56] References Cited

U.S. PATENT DOCUMENTS

| | | | |
|---|---|---|---|
| 3,875,024 | 4/1975 | Picquendar | 264/106 |
| 3,882,214 | 5/1975 | Nosker | 264/106 |
| 4,387,068 | 1/1983 | Llabres | 264/107 |
| 4,430,401 | 2/1984 | Wilkinson | 264/25 |
| 4,743,409 | 5/1988 | Nomura | 264/106 |
| 4,900,902 | 2/1990 | Sakakibara | 379/144 |
| 5,026,510 | 6/1991 | Yashima | 254/106 |

FOREIGN PATENT DOCUMENTS 092450 5/1986 Japan .

*Primary Examiner*—Jay H. Woo
*Assistant Examiner*—Jeremiah F. Durkin, II
*Attorney, Agent, or Firm*—Fitzpatrick, Cella, Harper & Scinto

[57] ABSTRACT

A cast mold and process for casting a substrate for an information recording medium has an uneven preformat pattern formed on the mold surface. The uneven preformat features a pattern corresponding to tracking grooves and information pits, each information pit portion has a size with a length b in the direction parallel to the pattern of the tracking groove of 2 to 15 μm and a width a in the direction perpendicular thereto of 1 to 6 μm and a height c of 300 to 3500 Å. The pit pattern has a pitch which is 1.8-fold or more of pit length b.

9 Claims, 2 Drawing Sheets

MOLD FOR FORMING SUBSTRATE HAVING UNEVEN PREFORMAT PATTERN AND METHOD OF USING SAME

This application is a continuation of application Ser. No. 321,404, filed Mar. 10, 1989 now U.S. Pat. No. 5,026,510.

BACKGROUND OF THE INVENTION

1. Field of the Invention

This invention relates to a mold for cast molding a substrate for information recording medium, and particularly, to a mold for casting having a preformat pattern of information pits.

2. Related Background Art

In the prior art is a substrate for information recording medium having an uneven preformat such as tracking grooves or pits for information address, etc. i.e., for optical information recording and reproduction. Such preformats have been formed on information recording medium substrates by (1) transferring an uneven preformat pattern of the stamper mold by the injection or hot press method when the substrate comprises a thermoplastic resin, (2) the the 2P method in which a photocurable resin composition is coated on a transparent resin plate comprising a thermosetting resin or a thermoplastic resin, colherins a stamper mold thereon, inpartins an energy such as UV-ray from the transparent resin side to cure the resin composition and thereby transferring the replica of the stamper mold onto the transparent resin and (3) the cast molding method in which a monomer of a resin or a prepolymer containing a solvent is injected into a casting mold having an uneven preformat pattern corresponding to the uneven preformat and then cured to effect the pattern.

However, the thermoplastic resin substrate obtained by the injection method or the hot press method suffers from warping the substrate after molding or occurrence of optical anisotropy due to residual stress or orientation of molecules by the thermal hysteresis during molding.

On the other hand, the substrate obtained by the 2P method is problematic in that the polymerization initiator and the monomer used during photopolymerization are liable to remain in the resin after photopolymerization and affect the optical recording layer of the recording medium, thereby causing deterioration of the recording characteristis.

As the method for preparing a substrate for information recording medium free from these problems, there may be sometimes used the cast molding method discussed above and as disclosed in Japanese Laid-open Patent Publication No. 61-92450. The substrate obtained by this method is substantially free from pressure applied during molding as compared with the methods (1) and (2), and also thermoplastic resins, thermosetting resins, photocurable resins are available for use as resins. Therefore it is possible to select a resin which does not have deleterious influence on the recording layer.

However, the substrate obtained by the injection molding method had the problem that the tracking groove and the edge portion of the information pit are missing after mold release.

The damage to the substrate occurring during mold release may be considered to be due to the stress applied primarily on the edge portion through the adhesive force between the substrate and the mold for cast molding and thermal shrinkage of the substrate. Since this stress is liable to be applied on the edge portion of the information pit which is in the direction perpendicular to the tracking groove, because the tracking groove exists lengthy in the lateral direction of the substrate, damage is liable to occure in the information pit rather than in the tracking groove.

FIG. 3 shows a sectional plan view of a preformat on the substrate having the defect generated during cast molding by use of a mold for cast molding of the prior art as described above. Particularly noticeable between the tracking grooves 1' of the preformat are defects 8 such as formless shape or crack which damages the pit at the edge portion 2' formed in parallel to said tracking groove 1'.

Such defects may cause reading incapability or reading error during reproduction of the preformat signal, resulting in damage of reliability of the information recording medium. In other words, generation of these defects is a problem which is a great obstacle in preparing an information recording medium of high reliability. Particularly, when the yield of the damage-free substrate becomes 50% or less the production cost of the information recording medium becomes prohibitive.

On the other hand, in such an information recording medium that the recording layer is formed by coating of a dye, etc. on a substrate having an uneven preformat, the recording medium is penetrated into the pit for preformat during coating, and particularly at the portion where the pits are provided approximate to each other, the thickness of the recording layer at the convexity between the information pits of the substrate (hereinafter called the land portion) becomes thinner.

Since the reflected light quantity when a laser beam is irradiated is determined depending on the thickness of the recording layer, there has been involved the problem that no sufficient reflected light quantity can be obtained.

U.S. Pat. No. 4,209,804 discloses a recording carrier which performs recording of recording information by varying the length of the information region. However, when such recording is performed, the pit length becomes longer and the land portion between the pits becomes shorter, whereby the land portion is very susceptible to be damage during mold release in cast molding.

SUMMARY OF THE INVENTION

The present invention has been accomplished in order to improve such problems of the prior art, to provide a cast mold which can reduce generation of defect during mold release of the substrate for information recording medium having an uneven preformat pattern to obtain good signal characteristics, and a method for preparing a substrate for information recording medium.

Another object of the present invention is to provide a method for preparing an optical recording medium which is free from information pit defects to reproduce information pits with high contrast.

More specifically, the mold of the present invention is a mold for cast molding a substrate for information recording medium having an uneven preformat pattern, wherein said uneven preformat pattern formed on the mold surface has at least a pattern corresponding to tracking grooves and information pits, each information pit portion has a size with a length b in the direction parallel to the pattern of the tracking groove of 2 to 15

μm and a width a in the direction perpendicular thereto of 1 to 6 μm and a height c of 300 to 3500 Å, and said pit pattern has a pitch which is 1.8-fold or more of said pit length b.

The method for preparing a substrate for information recording medium of the present invention is a method for preparing a substrate for information recording medium having an uneven preformat by use of a mold for cast molding, said mold being characterized in that an uneven preformat pattern corresponding to said uneven preformat formed on the mold surface has at least a pattern corresponding to tracking grooves and information pits, each information pit portion has a size with a length b in the direction parallel to the pattern of the tracking groove of 2 to 15 μm and a width a in the direction perpendicular thereto of 1 to 6 μm and a height c of 300 to 3500 Å, and said pit pattern has a pitch which is 1.8-fold or more of said pit length b.

Further, the method for preparing an information recording medium of the present invention has the following steps:

the step of preparing a substrate for information recording medium on which uneven preformat with at least tracking grooves and an information pits is formed by use of a mold for cast molding, said mold for cast molding having an uneven preformat pattern corresponding to said uneven preformat formed on the mold surface, the information pit portion of said uneven preformat pattern having a size of a length b of 2 to 15 μm and a width a of 1 to 6 μm and a height c of 300 to 3500 Å, and said pit pattern having a pitch which is 1.8-fold or more of said pit length b; and the step of forming a recording layer on said substrate for information recording medium.

Thus, according to the present invention, it may be considered that the stress caused by the heat shrinkage during curing of the cast molded resin and the adhesive force between the resin and the mold for casting applied on the edge portion of the information pit can be dispersed, and further by making the pit interval at least equal to the length of the pit, concentration of the above-mentioned stress on the edge of the information pit portion can be inhibited, whereby defects such as a lack on the substrate, etc. can be inhibited. By making the pit interval longer than the information pit length, reduction of the recording layer thickness at the land portion by inflow of the recording layer material into the pit portion when a recording layer is provided by coating can be made smaller, and therefore lowering in contrast around the information pit portion can be prevented.

DETAILED DESCRIPTION OF THE INVENTION

Figure 1A:
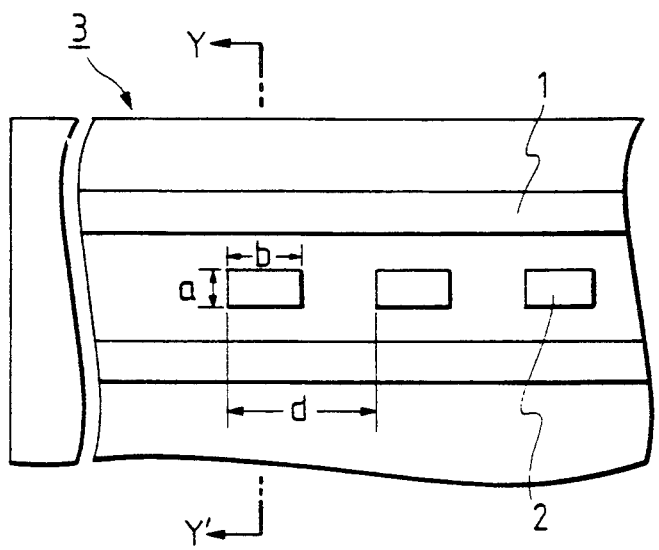
FIG. 1A is a partial plan view showing an embodiment of the mold for cast molding of a substrate for information recording medium of the present invention.

The present invention is now described by referring to the drawings.

Figure 1B:
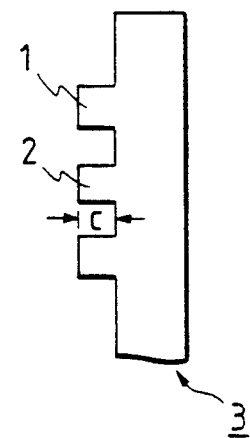
FIG. 1B is a sectional view taken along the line Y—Y' of the mold for cast molding in FIG. 1A.

FIG. 1A is a partial plan view showing an embodiment of the mold for cast molding of a substrate for information recording medium of the present invention, and FIG. 1B is a sectional view taken along the line Y—Y'. In the same Figure, the mold 3 for casting of the substrate for information recording medium of the present invention has an uneven preformat pattern with a convexity 2 corresponding to the information pit provided along the tracking groove between the convexities 1 which are the pattern corresponding to the tracking grooves provided in parallel.

In the present invention, the size of individual information pit portions 2 forming the pattern of the information pit formed on the mold surface of the mold 3 for casting, namely the length b, the width a, the height c and the pitch of the information pattern, is defined within a specific range, whereby the above objects could be accomplished. However, in the present invention, the defect generation ratio should be preferably 50% or lower, particularly 20% or lower, and the contrast 0.25 or more, particularly 0.35 or more.

In FIG. 1, when the size of the information pit portion is such that the length b in the direction parallel to the pattern 1 of the tracking groove is 2 to 15 μm, the width a in the direction perpendicular thereto is 1 to 6 μm, the height c is 300 to 3500 Å and the pitch d is 1.8-fold or more of the pit length b, particularly when b is, 3 to 12 μm, a is 2 to 4 μm, c is 1000 to 3000 Å, and the pitch is 2-fold or more of the pit length b, the defect generation ratio becomes 20% or less, and also when a recording layer is coated, the relationship between the film thickness of the pit portion and the film thickness of the land portion can be made optimum, whereby the contrast becomes also 0.35 or higher to give an optical recording medium further improved in reliability.

The mold for cast molding of the present invention can be prepared by conventional photolithographic technique, for example, by forming a Cr film on a glass substrate to the height of a pattern, coating a photoresist thereon, and then performing exposure, development and etching.

Next, the method for forming the substrate for information recording medium may be practiced by use of the mold for cast molding as described above according to conventional procedures of the cast molding method known in the art. As the material of the substrate for information recording medium may be used, for example, acrylic resins, epoxy resins, unsaturated polyesters, etc.

By providing a recording layer on the uneven preformat surface of the substrate for information recording medium can be obtained which has an uneven preformat thus obtained, and adhering a protective substrate through an adhesive layer, an information recording medium can be obtained which has an uneven preformat with the information pit portion having a size of a length b of 1 to 15 μm, a width a of 1 to 6 μm, a height of 300 to 3500 Å and a pitch d of 2-fold or more of the information pit length b.

As the recording layer for the present invention may be used, one which is varied in optical characteristics (e.g. refractive index, reflectance, transmission) by irradiation of recording light, and examples of such recording layer material may include organic dyes such as polymethine dyes, cyanine dyes, anthraquinone dyes, melocyanine dyes, transition metal complexes (e.g. diamine type metal complexes, dithiol type metal complexes), etc. or those incorporated into polymers, and further Bi, Te or chalcogenide compounds such as alloys of these, etc.

Otherwise, magnetic films such as TbFeCo, GdFeCo, which perform recording by use of the magneto-optical effect, by reversing magnetization on the Kerr effect or the Faraday effect, can be also used.

Figure 4:
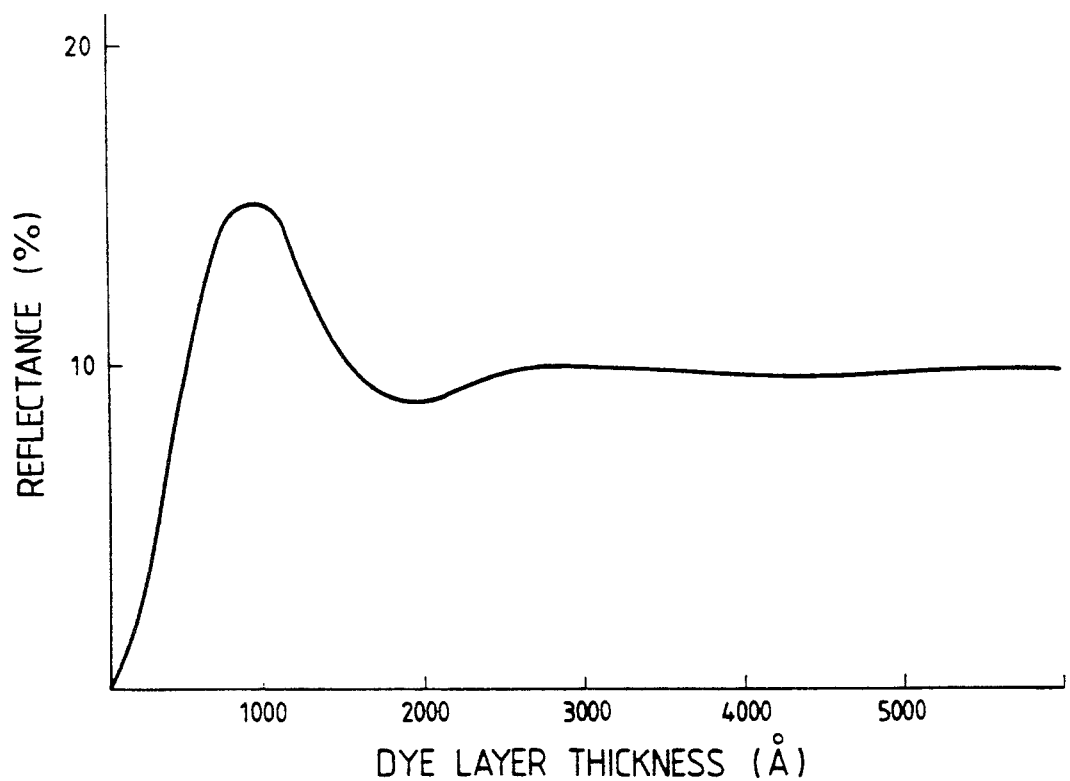
FIG. 4 shows the relationship between reflectance (%) and dye layer thickness (Å).

Such recording layer may be formed by coating (e.g. dip coating, spray coating, spinner coating, bar coating, blade coating, roll coating, curtain coating, etc.), or the gas phase deposition method such as vapor deposition, sputtering, etc. Particularly, in the present invention, even by inexpensive formation of recording layer by coating which can be prepared easily, reduction in film thickness at the land portion by inflow of the recording material into the information pit portion can be inhibited to give good contrast. More specifically, when 1,1,5,5-tetrakis-(p-diethylaminophenyl)-2,4-pentadienylperchlorate is used as the recording layer material, the relationship between its film thickness and the reflectance is known to be as shown in FIG. 4. In this case, the film thickness of the land portion is generally coated to 900 to 1000 Å which exhibits the maximum reflectance. At this time, the coating is effected with inflow into the tracking groove, etc. being previously considered, and also it has been practiced to improve the contrast of tracking signals by increasing the film thickness of the concavity by utilizing the inflow by controlling the depth, width of the tracking groove, thereby lowering reflectance. However, when the information pit portion is provided continuously, much inflow of the recording material occurs into the information pit, tracking groove in the recording layer at the land portions therebetween, and the film thickness becomes thinner than the defined value to lower the contrast, whereby troubles may be sometimes given to reproduction of information pit. In the substrate for information recording medium according to the present invention, it can be inhibited and therefore the substrate for information recording medium according to the present invention can be used more preferably for the information recording medium of which recording layer is formed by coating.

In the present invention, the uneven preformat pattern to be formed on the mold surface for cast molding corresponds to the information pit or tracking groove which becomes the positional information such as start pit or end pit as described above, and the unevenness relationship is inversed to the uneven preformat formed on the substrate surface for information recording medium. The pattern of the tracking groove may be specifically, for example, a spiral or concentric tracking groove for optical disc with a width of 0.5 μm to 2 μm and a pitch of 1.0 μm to 5 μm, or a pattern of tracking groove for parallel optical card with a width of 2 μm to 5 μm and a pitch of 8 μm to 15 μm. The optical card here refers to an information recording medium of portable size, having generally an area of 63.0 cm² or less, particularly 46.5 cm² or less, a thickness of 1.0 mm or less, particularly 0.85 mm or less, and a weight of 7 g or less, particularly 2 g to 6 g.

As described above, according to the present invention, an information recording medium of high reliability can be obtained which can inhibit generation of defect or lack, particularly around information pit, of the uneven preformat of the substrate for information recording medium during mold release in preparing a substrate for information recording medium having an uneven preformat by cast molding method.

Also, according to the present invention, an information recording medium which can reproduce information pit with high contrast can be obtained.

EXAMPLES

The present invention is described in more detail below by referring to Examples. However, the present invention is not limited to these Examples at all.

EXAMPLE 1

First, by use of a glass plate having a mirror surface with a thickness of 2.3 mm as the substrate, a chromium film was formed on said glass plate by the vacuum vapor deposition method. This thickness is a value taking into consideration the shrinkage of the resin for cast molding cured to the height of the preformat pattern. Next, on said chromium film was coated a posi-type photoresist (trade name: AZ-1350, manufactured by Hoechst Japan) by spin coating. Subsequently, the resist was subjected to exposure by photoirradiation through a mask formed correspondingly to the preformat pattern, and then developed with a developer (trade name: AZ-312, manufactured by Hoechst Japan) to have the chromium film beneath the photoresist exposed.

The preformat pattern was made a preformat pattern corresponding to an optical card having a tracking groove with a width of 3 μm and a pitch of 12 μm and a rectangular information pit with a length b, a height c, a constant pitch and a width a which is variously varied as shown in Table 1.

Next, the chromium film portion having the preformat pattern portion exposed thereon is etched with 6N hydrochloric acid until the glass plate of the substrate was exposed, and then thoroughly washed, followed by drying. The remaining photoresist was then removed by ashing according to the oxygen plasma ashing method to form a preformat pattern. Similarly, 100 sheets each of the mold having the same pattern were prepared.

By use of the resulting molds for cast molding, a glass plate of the same size of the mold having a mirror surface with a thickness of 3 mm was placed thereon through a spacer with a thickness of 0.4 mm interposed therebetween to prepare a cast molding device.

Into the cast molding device was injected as the liquid prepolymer a liquid acrylic resin having a formulated composition shown below.

Formulated Composition

Methyl methacrylate: 70 parts by weight
t-Butyl methacrylate: 25 parts by weight
Polyethylene glycol dimethacrylate (M.W. 620): 5 parts by weight After the liquid resin was injected into the cast molding device, curing was effected by heating at 135° C. for 6 hours to obtain a substrate for optical card in a size of 85 mm × 54 mm.

For each mold, a substrate for optical card was prepared in the same manner, and the ratio of defect generation on the substrate for information recording medium was examined to obtain the results shown in Table 1. The ratio of defect generation is a value of the number of the substrates on which one or more defects are generated divided by the total number of substrates and multiplied by 100. Examination of the defect on the substrate was conducted by observation with eyes and an optical microscope (×200).

EXAMPLE 2

Molds for cast molding were prepared in the same manner as described in Example 1 except for changing the dimensions of the information pit portion to the constant values of width a and height c, and variously varied length b as shown in Table 2, and substrates for information recording medium were prepared by use thereof. The defect generation ratios at this time are shown in Table 2.

EXAMPLE 3

Molds for cast molding were prepared in the same manner as described in Example 1 except for changing the dimensions of the information pit portion to the constant values of width a, length b and pitch d, and variously varied height c as shown in Table 3, and substrates for information recording medium were prepared by use thereof. The defect generation ratios at this time are shown in Table 3.

EXAMPLE 4

Molds for cast molding were prepared in the same manner as described in Example 1 except for changing the dimensions of the information pit portion to the constant values of width a, length b and height c, and variously varied pitch d as shown in Table 4, and substrates for information recording medium were prepared by use thereof. The defect generation ratios at this time are shown in Table 4.

EXAMPLE 5

Next, on the substrates for optical card obtained in Examples 1 to 4, as the recording layer, a 2 wt. % diacetone alcohol solution of 1, 1, 5, 5-tetrakis(p-diethylaminophenyl)-2,4-pentadienyl perchlorate was coated by a gravure coater so that a film thickness of the land portion without information pit around the substrate is 1000 Å, and reproduction of the information pits without defect at this time was effected and the contrast of the signal was examined. However, here, since the value of the pit length b is deeply correlated with the reproduction device, the contrast when a, c and d were varied was observed. The respective results at this time are shown in Tables 1 to 4.

Figure 2A:
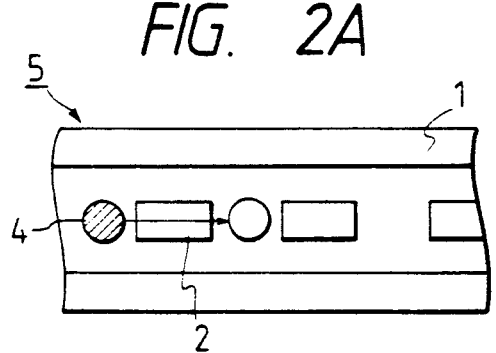
FIG. 2A is a partial plan view of the information recording medium according to the present invention.
Figure 2B:
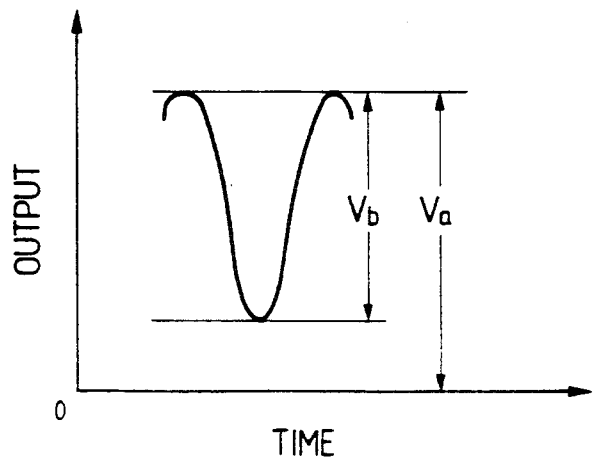
FIG. 2B is a schematic illustration showing the change in reflected light quantity when the information pit portion of the information recording medium shown in FIG. 2A is reproduced.
Figure 3:
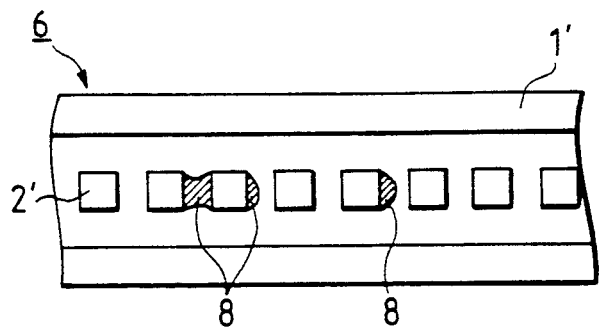
FIG. 3 is a partial plan view showing the defect generated at the information pit portion of the substrate for information recording medium of the prior art.

Te contrast was obtained as described below. That is, the reflected light intensity when the information pit of the optical card prepared in Example 5 was irradiated with a laser beam for reproduction of a spot diameter of 3 μm and a power of 0.3 mW and scanned as shown in FIG. 2A is represented on an oscilloscope as shown in FIG. 2B. Vb/Va at this time is made the contrast. The values of contrast shown in Tables 1 to 4 are average values of contrast for 100 sheets of optical cards having the information pit of the same pit size.

TABLE 1

| a | b | c | d | Defect generation ratio (%) | Contrast |
|---|---|---|---|---|---|
| 0.5 μm | 3 μm | 1000 Å | 6 μm | 75 | 0.20 |

TABLE 1-continued

| a | b | c | d | Defect generation ratio (%) | Contrast |
|---|---|---|---|---|---|
| 1 | 3 | 1000 | 6 | 25 | 0.36 |
| 2 | 3 | 1000 | 6 | 15 | 0.39 |
| 3 | 3 | 1000 | 6 | 10 | 0.44 |
| 6 | 3 | 1000 | 6 | 5 | 0.31 |

TABLE 2

| a | b | c | d | Defect generation ratio (%) | Contrast |
|---|---|---|---|---|---|
| 2 μm | 0.5 μm | 1000 Å | 1 μm | 20 | 0.16 |
| 2 | 1 | 1000 | 2 | 18 | 0.23 |
| 2 | 2 | 1000 | 4 | 17 | 0.30 |
| 2 | 3 | 1000 | 6 | 15 | 0.39 |
| 2 | 6 | 1000 | 12 | 14 | 0.42 |
| 2 | 12 | 1000 | 24 | 14 | 0.43 |
| 2 | 15 | 1000 | 30 | 12 | 0.43 |

TABLE 3

| a | b | c | d | Defect generation ration (%) | Contrast |
|---|---|---|---|---|---|
| 2 μm | 3 μm | 200 Å | 6 μm | 10 | 0.18 |
| 2 | 3 | 300 | 6 | 8 | 0.31 |
| 2 | 3 | 1000 | 6 | 15 | 0.39 |
| 2 | 3 | 3000 | 6 | 20 | 0.50 |
| 2 | 3 | 3500 | 6 | 40 | 0.48 |
| 2 | 3 | 4000 | 6 | 80 | 0.47 |

TABLE 4

| a | b | c | d | Defect generation ration (%) | Contrast |
|---|---|---|---|---|---|
| 2 μm | 3 μm | 1000 Å | 4 μm | 52 | 0.20 |
| 2 | 3 | 1000 | 5.0 | 30 | 0.24 |
| 2 | 3 | 1000 | 5.4 | 27 | 0.29 |
| 2 | 3 | 1000 | 6 | 15 | 0.39 |
| 2 | 3 | 1000 | 9 | 14 | 0.44 |
| 2 | 3 | 1000 | 12 | 15 | 0.43 |

From the above results of Examples 1 to 4, concerning defect generation ratio, the size of the pit for preformat should be preferably greater for a, is substantially irrelevant for b and preferably smaller for c. Also, when d is 1.8-fold or lower of the pit length b, defect generation ratio is higher.

As to the contrast of the reproduced signal of the information pit when used for an information recording medium, if c is small, the difference in thickness between the pit portion and the portion therearound is small, whereby the contrast is not sufficient. On the other hand, with a value of c of 1000 A or more, the contrast becomes substantially unchanged. Concerning a, it is correlated with the beam diameter of light, and the contrast is high in the vicinity thereof. When d is 1.8-fold or less of the pit length, the contrast is low.

I claim:

1. A mold having a mold surface for forming an information recording medium substrate having an uneven preformat pattern, said mold surface comprising said uneven preformat pattern formed thereon, said uneven preformat pattern having tracking groove portions corresponding to information pits, wherein each information pit portion has a size with a length (b) of 2 to 15 μm in the direction parallel to the pattern of the tracking groove, a width (a) of 1 to 6 μm in the direction perpendicular thereto and a height (c) of 300 to 3500 Å, said pit pattern having a pitch in the direction parallel to the pattern of the tracking grooves and said pitch being at least 1.8 (b).

2. A mold for forming according to claim 1, wherein (b) is from 3 to 12 μm, (a) is from 2 to 4 μm, (c) is from 1000 to 3000 Å and said pit pattern has a pitch of at least 2 (b).

3. A method for preparing an information recording medium substrate comprising the steps of:

selecting a mold having a mold surface for forming said substrate, said casting mold surface comprising an uneven preformat pattern formed thereon, said uneven preformat pattern having tracking groove portions corresponding to tracking grooves and information pit portions corresponding to information pits, wherein:

each information pit portion has a size with a length (b) of 2 to 15 μm in the direction parallel to the pattern of the tracking groove, a width (a) of 1 to 6 μm in the direction perpendicular thereto and a height (c) of 300 to 3500 Å, said pit pattern having a pitch in the direction parallel to the pattern of the tracking grooves, said pitch being at least 1.8 (b);

adding into said mold a substrate-forming composition comprising at least one of monomer or prepolymer; and polymerizing and curing said substrate-forming composition.

4. A method for preparing a substrate according to claim 3, wherein (b) is from 3 to 12 μm, (a) is from 2 to 4 μm, (c) is from 1000 to 3000 Å, and the pitch is at least 2 (b).

5. A method for preparing an information recording medium, comprising the steps:

selecting a mold having a mold surface for an information recording medium substrate having an uneven preformat pattern, said mold surface comprising an uneven preformat pattern formed thereon, said uneven preformat pattern having tracking groove portions corresponding to tracking grooves and information pit portions corresponding to information pits, wherein each information pit portion has a size with a length (b) of 2 to 15 μm in the direction parallel to the pattern of the tracking groove, a width (a) of 1 to 6 μm in the direction perpendicular thereto and a height (c) of 300 to 3500 Å, said pit pattern having a pitch in the direction parallel to the pattern of the tracking grooves, said pitch being at least 1.8 (b);

forming a substrate using said mold; and forming a recording layer on said substrate.

6. A method for preparing an information recording medium according to claim 5, wherein (b) is from 3 to 12 μm, (a) is from 2 to 4 μm, (c) is from 1000 to 3000 Å, and the pitch is at least 2 (b).

7. A method for preparing an information recording medium accordint to claim 5, wherein said recording layer is formed by coating.

8. A method for preparing an information recording medium according to claim 7, wherein the material for said recording layer is an organic dye.

9. A method for preparing an information recording medium according to claim 5, wherein said information recording medium is an optical card.

* * * * *

UNITED STATES PATENT AND TRADEMARK OFFICE
CERTIFICATE OF CORRECTION

PATENT NO. : 5,122,313

DATED : June 16, 1992

INVENTOR(S) : MASATAKA YASHIMA

Page 1 of 2

It is certified that error appears in the above-identified patent and that said Letters Patent is hereby corrected as shown below:

COLUMN 1

Line 19, "etc. i.e.," should read --etc., i.e.,--.
    Line 25, "the the" should read --the--.
    Line 28, "colherins" should read --adhering--.
    Line 49, "characteristis." should read --characteristic.--.

COLUMN 2

Line 5, "lengthy" should read --lengthwise--.
    Line 6, "occure" should read --occur--.
    Line 23, "less the" should read --less, the--.
    Line 33, close up right margin.
    Line 34, close up left margin.
    Line 45, "be damage" should read --being damaged--.
    Line 50, "improve" should read --overcome--.

COLUMN 3

Line 24, "pits" should read --pit--.

UNITED STATES PATENT AND TRADEMARK OFFICE
CERTIFICATE OF CORRECTION

PATENT NO. : 5,122,313
DATED : June 16, 1992
INVENTOR(S) : MASATAKA YASHIMA

Page 2 of 2

It is certified that error appears in the above-identified patent and that said Letters Patent is hereby corrected as shown below:

COLUMN 5

Line 5, "melocyanine" should read --merocyanine--.

COLUMN 7

Line 53, "Te" should read --The--.

COLUMN 10

Line 27, "accordint" should read --according--.

Signed and Sealed this

Fifth Day of October, 1993

Attest:

BRUCE LEHMAN

*Attesting Officer*    *Commissioner of Patents and Trademarks*